Nov. 5, 1968  D. E. HARDESTY ETAL  3,409,680
PRODUCTION OF TRANS-STILBENE AND HALOGEN DERIVATIVES THEREOF
Filed May 9, 1966
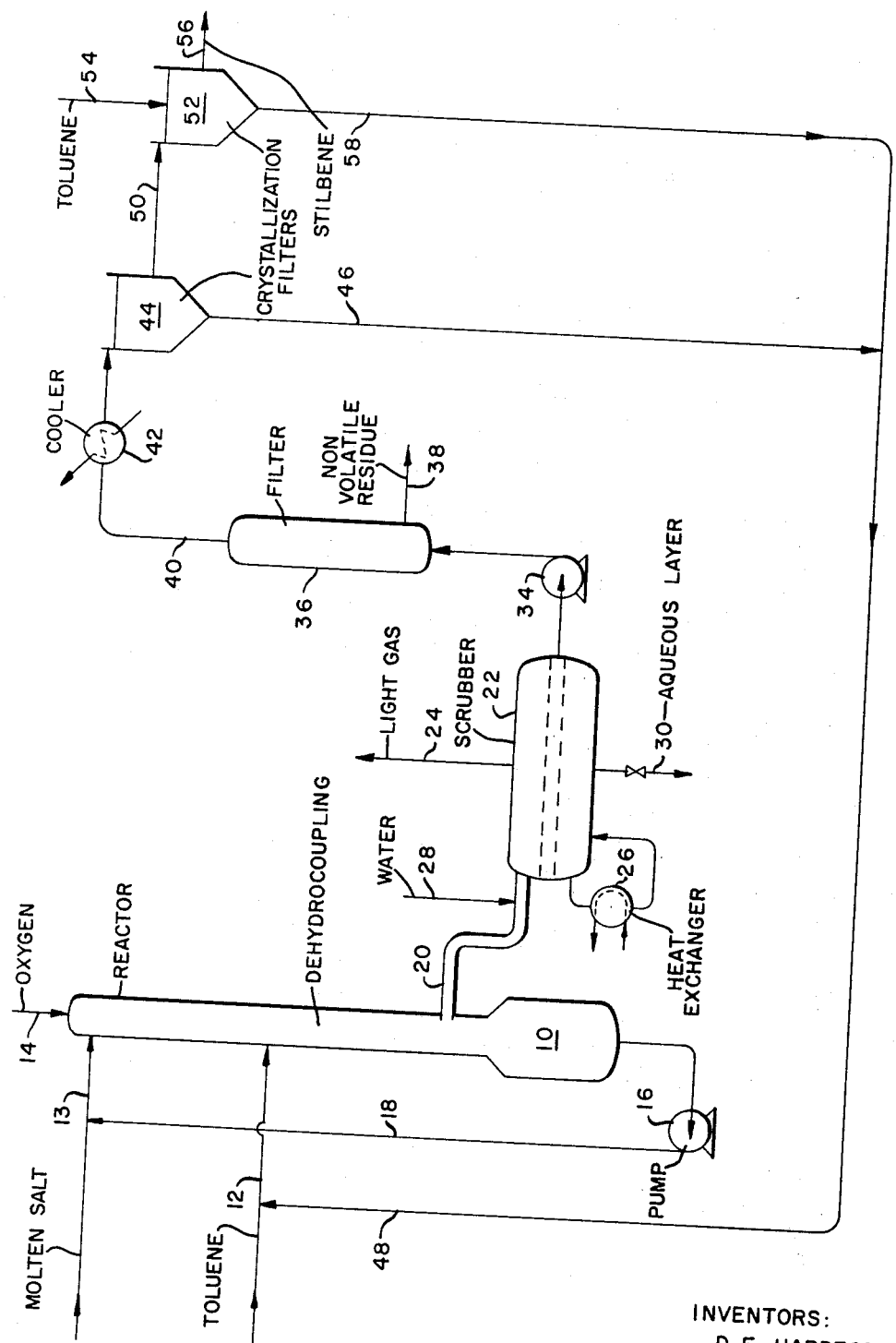
INVENTORS:
D. E. HARDESTY
H. L. BENSON, JR.
BY John H. Colvin
THEIR ATTORNEY

United States Patent Office 3,409,680
Patented Nov. 5, 1968

3,409,680
PRODUCTION OF TRANS-STILBENE AND
HALOGEN DERIVATIVES THEREOF
Donald E. Hardesty and Herbert L. Benson, Jr., Houston, Tex., assignors to Shell Oil Company, New York, N.Y., a corporation of Delaware
Filed May 9, 1966, Ser. No. 548,734
6 Claims. (Cl. 260—649)

ABSTRACT OF THE DISCLOSURE

Trans-stilbene is obtained as major product in iodinative dehydrocoupling of toluene in the presence of molten metal iodide, by maintaining a controlled conversion in the range of 10 to 30% followed by crystallization of the trans-stilbene from the condensed reactor effluent.

---

This invention relates to a process for the production of trans-stilbene and halogen derivatives thereof.

Trans-stilbene, until the present time, has been unavailable in large quantities; hence, it has been little more than a laboratory curiosity. However, certain substituted stilbenes, e.g., 4,4'-dinitro-stilbene-2,2'-disulfonic acid and the reduced diamines, are useful as dyes and optical brighteners.

Several methods have been devised for producing trans-stilbene. For example, U.S. Patent 2,645,671 to Mattano, issued July 14, 1953, discloses a process for the production of trans-stilbene from benzyl mercaptan. Another known method is heating benzalchloride with powdered zinc. These methods, however, suffer from two major disadvantages: high cost of starting materials; and low yields and purities of the products.

Maxwell Nager, in U.S. Patent 3,080,435, issued Mar. 5, 1963, discloses a process for dehydrogenating organic compounds, including broadly dehydrocoupling, by iodative dehydrogenation of organic compounds by reaction with elemental iodine in a molten metal iodide environment to produce corresponding dehydrogenated compounds.

U.S. Patent 3,168,584, issued Feb. 2, 1965, to Nager, discloses that a small amount of trans-stilbene is produced in an iodative dehydrocoupling reaction involving two molecules of toluene. However, the stilbenes were by-products in the production of para-xylene. No attempt was made to separate the trans-tilbene from the product xylene to obtain stilbene itself.

In the iodative dehydrocoupling of toluene according to the method described in U.S. 3,168,584, the product stilbene obtained at high conversion levels (i.e., greater than about 40% of the initial feed), was a dark-colored solid, and proved to be extremely difficult to handle. Further, some of the organic iodides produced by the reaction, and appearing in the crude product, were unstable at the relatively high temperatures (about 585° F.) required to flash trans-stilbene; and several stages of fractional crystallization of the crude product from toluene failed to yield trans-stilbene of satisfactory color and purity.

It is, therefore, an object of the present invention to provide a process for the production, and subsequent purification, of trans-stilbene, and halogen derivatives of trans-stilbene, in high yields and high product purities.

Other objects, aspects and advantages of the invention will be apparent from the following description, which will be made in part with reference to the accompanying drawing, wherein the sole figure is a flow diagram illustrating the production of trans-stilbene from toluene, and its subsequent purification by crystallization.

It has now been found that the difficulties mentioned are obviated by carrying out the iodative dehydrocoupling of toluene or of halophenylmethane at low conversion (about 10% to 30% by weight), followed by crystallization of the resulting stilbene from the liquid condensate of the dehydrogenation. By operating at a conversion level of from about 10% to about 30% by weight of the feed, a liquid product stream condensate is obtained at a temperature below the normal boiling point of the feed but not low enough to cause crystallization of stilbene (or halo-derivative thereof) from the unconverted toluene (or halophenyl methane). Temperatures within about 100° F., preferably within about 50° F., and still more preferably, within about 25° F., of the normal boiling point of the feed may be used. Selectivities to trans-stilbene and to the substituted trans-stilbenes of 85% to 90% by weight (carbon basis) can be readily obtained. When the condensate is cooled to ambient temperature, a major portion of the stilbene product will crystallize out of the unconverted feed; it is preferred, however, that the temperature to which the condensate is cooled is low enough to crystallize at least about 95% by weight of the product from the feed before the feed is recycled to the reactor. The crystalline product can then be separated by physical means, such as filtration. Stilbene prepared according to the process of the invention is of good color and high purity (greater than 99% by weight, hydrocarbon basis).

The present invention is applicable to the preparation of halostilbenes, with the halogen atoms being bonded to aromatic carbons, particularly to the halogen-substituted stilbenes having from 1 to 3 halogen atoms on either of the benzene rings. By combining a low feed conversion with subsequent product purification by crystallization from unconverted feed, halo-stilbenes can be produced possessing good color, and a purity of greater than 98% by weight.

The halostilbenes prepared by the method of this invention are, preferably, the chloro-, bromo- and iodo-derivatives; the halogen atoms may be alike or different. The bond connecting the halogen to the aromatic ring is not easily ruptured; and, indeed, several halogenated aromatics, such as iodotoluene and iodobenzene, are formed as by-products in the iodative dehydrocoupling of toluene. Generally, it is preferred that, in the halotoluene precursor, the halogen be meta and/or para with respect to the methyl group. By way of example, suitable precursors for the halostilbenes are 4-chlorotoluene, 4-bromotoluene, 4-iodotoluene; 3-chlorotoluene, 3-iodotoluene; 3,4-dichlorotoluene, 3,4-dibromotoluene, 3,4-diiodotoluene; 3-iodo-4-chlorotoluene, 3-bromo-4-chlorotoluene, 3-iodo-4-bromotoluene; 3,4,5-trichlorotoluene, 3,4,5-triiodotoluene, 3,4-dichloro-5-iodotoluene, and 3,5-dibromo-4-chlorotoluene.

A preferred molten salt environment in which the dehydrocoupling of toluene occurs, generally described in Nager U.S. 3,080,435, contains lithium iodide (70–98% by weight) and lithium hydroxide (2–5% by weight) and may contain from 0% to about 20% by weight potassium iodide, sodium iodide and/or lithium sulfate as a diluent. The reactor itself may be a horizontal, elongated reactor with vertically disposed baffles therein; or an upright baffled or packed or essentially unobstructed reactor; or any other type of reactor in which the feed is intimately contacted with the molten mass in the presence of elemental iodine.

A preferred embodiment of the invention is illustrated in the accompanying drawing. A hydrocarbon feed (toluene for the production of trans-stilbene) is fed into a packed downflow dehydrocoupling reactor 10 through line 12. A molten salt mixture of essentially lithium iodide containing a minor amount (about 2–5% by weight) of lithium hydroxide/oxide is fed to the top of the reactor by line 13. Oxygen and water are fed to the reactor through line 14. In the upper, iodine regeneration zone, oxygen liberates iodine from a portion of the lithium iodide, and the lithium is converted, with the oxygen and water, to lithium hydroxide. In the lower, dehydrocoupling zone, the iodative dehydrocoupling of toluene takes place in the presence of the molten salt to form stilbene as the principal product. The reaction is preferably carried out at a temperature of between about 975° F. and 1075° F., and at an oxygen:feed molar ratio of between about 0.08:1.0 and 0.3:1.0. The molten salt flows into an enlarged bottom zone, from which it is recycled via pump 16 and lines 18 and 13 to the top of the reactor. Baffle means is provided in the reactor just above the outlet for line 20, adapted to trap organic vapors and inert gases above the molten salt in the lower reservoir. The vaporous stream is passed via line 20 into scrubber 22, operated at a temperature of between 130° F. and 220° F., preferably between about 150° F. to 200° F., where the light gases are removed via line 24, and any entrained organic material is washed out as a lower aqueous layer through a valved outlet 30 at the bottom of the scrubber. The temperature of the scrubber is maintained at a point below the condensation temperature of the product by heat exchanger 26. Water may be added through line 28 as an aqueous wash liquid, entering line 20 at a temperature corresponding to that at which the scrubber is operated, and additional quantities of feed may be added at this point, if desired. From the scrubber, the product proceeds through pump 34 into a first filter 36, which removes any non-volatile residue present in the crude liquid product and which was not removed in the scrubber. This residue is removed via line 38. The filtrate from filter 36 is transferred by line 40 to a cooler 42, where its temperature is reduced to from about 20° F. to 80° F. to crystallize out the stilbene. At 20° F., less than about 5% of the trans-stilbene remains in the unconverted feed. The resulting slurry is filtered in filter 44, partially purified stilbene being separated from unconverted feed, together with by-product iodides and other intermediates, and a small amount of stilbene. The filtrate is passed via line 46 into hydrocarbon feed return line 48, for re-entry into the reactor via line 12. The partially purified stilbene crystals are transferred via line 50 to filter 52, and are washed with fresh toluene entering through line 54. The pure product is removed from filter 52 via line 56, and the toluene wash liquor is fed to line 48 via line 58, for feed to the reactor.

The above description has been made with reference to the production of trans-stilbene; however, the scheme is also applicable to the production and purification of the halostilbenes, produced by the iodative dehydrocoupling of the corresponding halotoluene feed, or the cross-coupling of halotoluene and toluene.

The following examples are given for illustrative purposes only, and are not to be considered as limiting the invention. All percentages are expressed in percent by weight.

Example I

Toluene was fed into an iodative dehydrocoupling zone of a reactor operated at a temperature of about 1075° F., and containing elemental iodine and a mixture of molten salts consisting essentially of lithium iodide, lithium hydroxide and lithium sulfate. Water and oxygen were introduced into the regeneration zone of the reactor at an oxygen/toluene molar ratio of about 0.14, and at a water/oxygen molar ratio of about 3.0. The average residence time of the organic material in the reactor was about 1.2 seconds. A conversion level of about 17.8% was obtained, with the following selectivities (carbon basis) to the various products:

| | Percent |
|---|---|
| Organic iodides | 1.6 |
| 1,2-diphenylethane | 9.2 |
| Trans-stilbene | 86.7 |
| Heavier than stilbene | 2.5 |

It is thus seen that a high selectivity (over 80%) to trans-stilbene is achieved by operating at low levels of conversion of the initial feed.

Example II

Several runs were made following the procedure of Example I, but at higher conversions. The results are given in Table I:

TABLE I

| Conversion, percent of Initial Feed | Oxygen/Toluene, mole/mole | Selectivity to trans-Stilbene, percent (C basis) |
|---|---|---|
| 61.2 | 0.60 | 72 |
| 55.3 | 0.49 | 70.8 |
| 42.6 | 0.41 | 78.7 |

The foregoing data show that as the conversion of the toluene is decreased, the selectivity to the desired trans-stilbene product is increased; that smaller proportions of oxygen give lower conversions of toluene and higher selectivities to trans-stilbene. At a conversion of about 10%, the selectivity to trans-stilbene is about 90%, while at a conversion of about 30%, the selectivity to trans-stilbene is about 82%. For a conversion of about 30%, an oxygen/toluene molar ratio of about 0.3 is needed, while a ratio of about 0.08 gives a conversion of about 10%. In other words, for conversions of 10% and 30% by weight, iodine/toluene molar ratios of about 0.16 and 0.6, respectively, are required.

Example III

The procedure used in Example I was used for the preparation of 4,4'-dichlorostilbene from 4-chlorotoluene, using a molten salt system of the following average composition in the reactor:

| | Percent |
|---|---|
| Lithium iodide | 72.7 |
| Potassium iodide | 20.8 |
| Lithium hydroxide | 1.34 |
| Lithium carbonate | 0.36 |
| Lithium chloride | 5.23 |
| Total insolubles | 0.45 |

The conditions and results of two runs are given in Table II.

TABLE II

| Run No. | 1 | 2 |
|---|---|---|
| Temperature, °C | 1,050 | 1,045 |
| Residence Time, seconds | 1.1 | 1.1 |
| Water/Oxygen, molar ratio | 6.4 | 1.5 |
| Oxygen/Feed, molar ratio | 0.13 | 0.23 |
| Conversion (basis 4-chlorotoluene), percent | 12.0 | 27.0 |
| Selectivity (carbon basis), percent: | | |
| Methane | 0.0 | 0.0 |
| Unidentified | (1) | 0.09 |
| Toluene | 0.35 | 0.30 |
| Iodotoluene | 0.64 | 0.80 |
| Iodochlorobenzene | 0.57 | 1.41 |
| Unidentified | 0.0 | 0.40 |
| Mass No. 216 ($C_{14}H_{13}Cl$?) | 0.50 | 0.12 |
| 4,4'-dichloro-1,2-diphenylethane | 18.8 | 3.19 |
| 4,4'-dichlorostilbene | 69.4 | 84.8 |
| $C_{14}H_{10}Cl_2$ | 5.46 | 7.49 |
| $CO + CO_2$ | 4.32 | 1.32 |
| Recovery, percent (carbon basis) | 91.2 | 89.5 |

¹ Trace.

The results shown in Table II are for runs in which recoveries of about 90% were obtained. The main effect of increasing the conversion from 12% to 27% was to increase the 4,4′-dichlorostilbene selectivity from 69% to 85% at the expense of the primary coupling product, 4,4′ - dichloro - 1,2 - diphenylethane. While the total selectivity to coupled products, 4,4′ - dichlorostilbene and dichlorodiphenylethane, remained constant at about 88%, the 4,4′-dichlorostilbene/dichlorodiphenylethane ratio increased from 3.7 to 26.6. It should be noted that the low selectivities to toluene and iodotoluene indicate that only little carbon-chlorine bond rupture occurs in the molten salt environment; salt analyses before and after the runs confirmed this result, as negligible changes in the chloride content were observed.

Example IV

When a procedure as employed in Example I is used, except with 4 - iodotoluene as the feed instead of 4-chlorotoluene, 4,4′ - diiodostilbene is obtained in good yield and high purity.

The invention, by combining low conversion operation in a continuous process with product purification by crystallization from the unconverted feed, offers a simple and direct route to the low-cost production of stilbene and its halogen derivative. This crystallization is generally at a temperature of at least 50° F. lower, preferably at least 100° F. lower, than the temperature at which the condensate is produced; e.g., for stilbene, as already noted, it is at about 20° to 80° F. with condensation at 130–220° F., while for dichlorostilbene the condensation is suitably done at about 230° F. and the crystallization at about 130° F. or lower, preferably not above 80° F.

Having described the invention, it will be readily appreciated that modification within the skill of a person skilled in the art is intended to be within the scope of this invention, which is limited only by the claims attached hereto.

We claim as our invention:

1. In a continuous process for the production of a reaction product selected from the group consisting of trans-stilbene and halogen substituted stilbene having halogen selected from the group consisting of chlorine, bromine and iodine directly attached to the aromatic ring, wherein a corresponding reactant selected from the group consisting of toluene and halogen-substituted toluene, respectively, is iodatively dehydrocoupled in a reaction zone by intimate contact, in vapor phase, at a temperature of from about 975° to about 1075° F., with elemental iodine and a molten salt comprising lithium iodide, in the presence of oxygen added in a mole ratio of oxygen to said reactant of from about 0.08:10 and 0.3:10, thereby forming a reaction mixture comprising said reaction product, the improvement consisting essentially of operating at a conversion level of said reactant to said reaction product in said reaction zone within the range of from about 10 to about 30% throughout the course of the dehydrocoupling reaction, condensing the effluent from said reaction zone thereby forming a liquid condensate comprising said reaction product, and cooling the resulting liquid condensate to effect the selective separation by crystallization of said reaction product therefrom.

2. The process in accordance with claim 1 wherein the iodine to reactant feed molar ratio is between about 0.16 and 0.6.

3. The process in accordance with claim 1 wherein the reactant feed is 4-chlorotoluene and the reaction product is 4,4′-dichlorostilbene.

4. The process in accordance with claim 1 wherein said crystallization of said reaction product from said liquid condensate is effected at a temperature which is at least about 100° F. below the temperature at which the condensate is produced.

5. The process in accordance with claim 1 wherein the feed reactant is toluene and the reaction product is trans-stilbene.

6. The process in accordance with claim 5, wherein said liquid condensate is maintained at a temperature of about 130° to about 220° F. and subsequently cooled to a temperature of from about 20° to about 80° F. to crystallize trans-stilbene therefrom.

References Cited

UNITED STATES PATENTS

| 3,004,076 | 10/1961 | Le Suer et al. | 260—649 |
| 3,080,435 | 3/1963 | Nager | 260—668 XR |
| 3,084,203 | 4/1963 | Le Suer et al. | 260—649 |
| 3,168,584 | 2/1965 | Nager | 260—668 XR |

LEON ZITVER, *Primary Examiner.*

H. T. MARS, *Assistant Examiner.*